United States Patent
Steves (10) Patent No.: US 9,213,736 B2
(45) Date of Patent: *Dec. 15, 2015

(54) OPERATING SYSTEM FINGERPRINTING (71) Applicant: Infoblox Inc., Santa Clara, CA (US)

(72) Inventor: Kevin Steves, San Diego, CA (US)

(73) Assignee: Infoblox Inc., Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/888,259

(22) Filed: May 6, 2013

(65) Prior Publication Data
US 2013/0318113 A1    Nov. 28, 2013

Related U.S. Application Data

(63) Continuation of application No. 11/509,321, filed on Aug. 23, 2006, now Pat. No. 8,458,308.

(51) Int. Cl.
| | | |
|---|---|---|
| *G06F 15/173* | (2006.01) | |
| *G06F 17/30* | (2006.01) | |
| *G06F 21/44* | (2013.01) | |
| *G06F 21/57* | (2013.01) | |
| *H04L 29/12* | (2006.01) | |
| *H04L 29/06* | (2006.01) | |

(52) U.S. Cl.
CPC .......... *G06F 17/30386* (2013.01); *G06F 21/44* (2013.01); *G06F 21/577* (2013.01); *H04L 61/2015* (2013.01); *H04L 63/10* (2013.01)

(58) Field of Classification Search
CPC ........ G06F 17/30; G06F 9/4406; H04L 41/22
USPC ....................................................... 709/223
See application file for complete search history.

(56) References Cited

U.S. PATENT DOCUMENTS

| | | | | |
|---|---|---|---|---|
| 2004/0194027 A1* | 9/2004 | Suzuki et al. | ................. | 715/515 |
| 2007/0038739 A1* | 2/2007 | Tucker | ................. | 709/224 |
| 2007/0283007 A1* | 12/2007 | Keir et al. | ................. | 709/224 |
| 2011/0281655 A1* | 11/2011 | Nguyen et al. | ................. | 463/42 |

* cited by examiner

*Primary Examiner* — Phuoc Nguyen
(74) *Attorney, Agent, or Firm* — Van Pelt, Yi & James LLP (57) ABSTRACT

Determining operating system data is disclosed, including receiving a message associated with a network protocol, extracting a set of one or more features from the message, and determining operating system data at least in part by matching one or more features of the message with one or more features of a fingerprint associated with an operating system. An exact match of the features is not required to determine operating system data.

57 Claims, 8 Drawing Sheets

OPERATING SYSTEM FINGERPRINTING

CROSS REFERENCE TO OTHER APPLICATIONS

This application is a continuation of U.S. patent application Ser. No. 11/509,321, now U.S. Pat. No. 8,458,308 entitled OPERATING SYSTEM FINGERPRINTING filed Aug. 23, 2006 which is incorporated herein by reference for all purposes.

BACKGROUND OF THE INVENTION

The Dynamic Host Configuration Protocol (DHCP) is a network protocol that manages the assignment of IP addresses, subnet masks, default routers, and other IP parameters. The assignment usually occurs when a DHCP configured device boots up or regains connectivity to the network. The DHCP client sends out a query requesting a response from a DHCP server on the network. The DHCP server then replies to the client with its assigned IP address, subnet mask, DNS server and default gateway information. DHCP uses broadcast and unicast.

DHCP may be used in conjunction with authentication and authorization. For example, a user attempting to connect to a network at a hotel is redirected to a registration or sign-in page, where the user agrees to a usage policy and charges for accessing the network. Authenticating the user may be dependent on the information about the device. For example, it the user is running a Windows device, then the user is authenticated. If the user is using an IP telephone, the user is not authenticated. If the device has previously been authenticated, the device is not re-authenticated. Different types of vulnerability scans may be performed depending on the operating system of the device. For example, a different scan is performed for Microsoft and Apple operating systems. In addition, if the device is identified as violating a policy, then the authentication is terminated immediately. For example, the policy specifies that no wireless access points are permitted on the network.

Existing methods to determine information about a client device include active approaches, which require sending a message to the DHCP client to elicit a response. Active approaches are limited in that for security reasons, the client may only allow requests from certain IP addresses.

Thus, an improved method for determining information about a client device is needed. In particular, it would be useful to be able to identify information associated with the operating system of the client device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
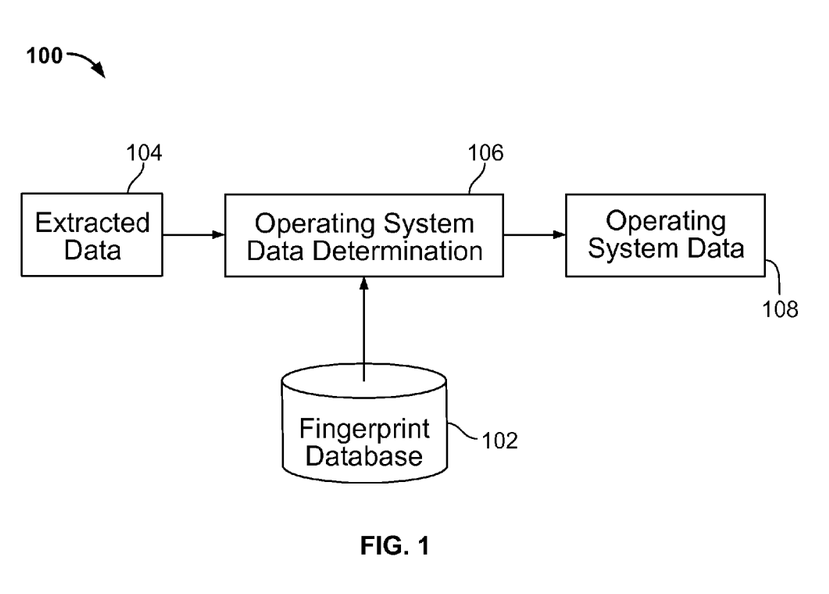
FIG. 1 is a block diagram illustrating an embodiment of a system for determining operating system data.

FIG. 1 is a block diagram illustrating an embodiment of a system for determining operating system data. In the example shown, system 100 is shown to include a fingerprint database 102, extracted data 104, operating system (OS) data determination block 106 and OS data 108.

OS data determination block 106 obtains extracted data 104. Extracted data 104 is obtained from observed DHCP messages from DHCP clients. For example, one or more of IP header, UDP header, BOOTP header, and DHCP options information is extracted, as more fully described below. Fingerprint database 102 includes features of DHCP messages that are unique to various operating systems. Examples of features include fields and field values. For example, if DHCP messages from only Windows devices include "MSFT" in the DHCP option field "Vendor Class," then this is a unique feature of a DHCP message from a device running Windows. In other words, this feature can be part of the fingerprint for the Windows operating system. In various embodiments, data in fingerprint database 102 is stored various ways, such as in a table, a file, a linked list, an ordered tree, etc. Using fingerprint database 102, OS data determination block 106 determines operating system data 108 associated with extracted data 104. Operating system data 108 includes information about the OS at any level of granularity, from the vendor (e.g., Microsoft) to the exact version and service pack (e.g., Microsoft Windows XP Service Pack 2). In some embodiments, operating system data 108 includes information about the implementation of the DHCP client, as more fully described below. In some embodiments, operating system data 108 includes other information about hardware, firmware, or software running on the device.

In various embodiments, the operating system data is stored in various ways. In some embodiments, the operating system data is stored as metadata for the DHCP lease. In some embodiments, the operating system data is viewable in a GUI as well as available via an API, such as a Perl API.

Operating system data 108 may be used in various ways. Different activities may be performed based on OS data 108. In some embodiments, an authorization and/or authentication program queries for the operating system data and uses it to make a policy decision. For example, the OS data 108 could be used to make a judgment on what type of vulnerability scan to perform on the client. In another example, OS data 108 could be used to terminate the authentication sequence. For example, a possible wireless access point is identified that is prohibited. In another example, if an IP phone comes on the network, OS data 108 could be used to determine which lease range and VLAN to use.

In some embodiments, a DHCP server includes OS data determination block 106. In some embodiments, another program such as an authentication and/or authorization program includes or communicates with OS data determination block 106. Various DHCP servers may be used. Examples of DHCP servers include ISC DHCP, Microsoft DHCP, dhcpd from OpenBSD, Infoblox DNSone®. The DHCP client may run on any appropriate device and operating system. Examples of devices include personal computers, laptops, IP telephones, mobile devices, etc. Examples of operating systems include Windows XP Pro, Mac OS X, Apple Airport Express, NetScreen ScreenOS, OpenBSD, Unix, Linux etc. Examples of these systems are provided below.

Figure 2:
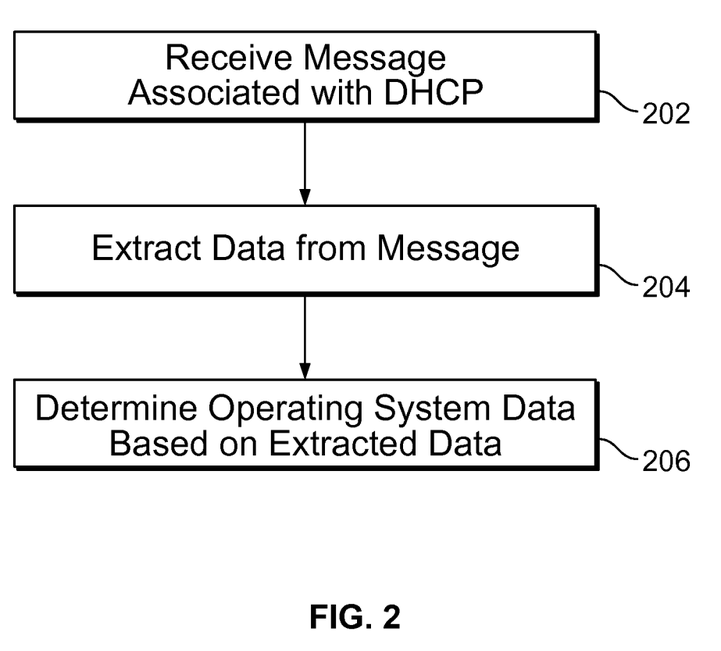
FIG. 2 is a flow chart illustrating an embodiment of a process for determining operating system data about a client device.

FIG. 2 is a flow chart illustrating an embodiment of a process for determining operating system data about a client device. In some embodiments, this process is performed by OS determination block 106. In the example shown, a message associated with DHCP is received at 202. Examples of messages associated with DHCP include DHCP discover, DHCP request, DHCP inform, DHCP decline, and DHCP release messages. At 204, data is extracted from the message. Data extracted includes features of the message. Examples of features include fields, order of the fields, field values, order of the field values, and any other feature associated with the message. For example, one or more field values are extracted from the message. Examples of fields include IP header, UDP header, BOOTP header, and/or DHCP options fields. At 206, operating system data is determined based on the extracted data. In some embodiments, the field values are prioritized and a fingerprint database is consulted to determine operating system data, as more fully described below. In some embodiments, data from multiple messages is used to determine the operating system. For example, data from a first message may be used to narrow down the operating system to two choices. Data from a second message may be used to select from the two choices.

Figure 3:
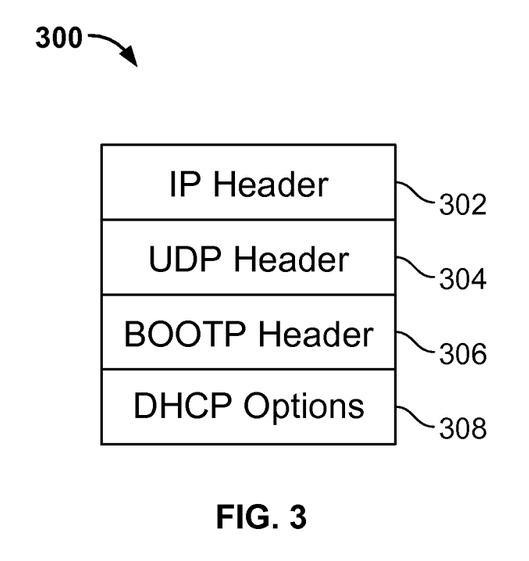
FIG. 3 illustrates an example of fields in a DHCP message sent to a DHCP server from a client device.

FIG. 3 illustrates an example of fields in a DHCP message sent to a DHCP server from a client device. In some embodiments, one or more of these field values is extracted at 204 in FIG. 2. As shown, DHCP message 300 includes IP header fields 302, UDP header fields 304, BOOTP header fields 306, and DHCP options fields 308. Examples of IP header fields 302 include type of service, time to live, IP ID, offset, flags, protocol, and length. Examples of UDP header fields 304 include UDP checksum, source IP address, source port, destination IP address, and destination port. Examples of BOOTP header fields 306 include client MAC address, flags, and transaction ID. Examples of DHCP options fields 308 include DHCP message type (option 53), auto-configuration option (option 116), client identifier (option 61), host name (option 12), vendor class identifier (option 60), maximum DHCP message size (option 57), and parameter request list (option 55). The parameter request list includes one or more parameters being requested from the DHCP server.

The following are examples of client DHCP messages obtained using a packet sniffing program called tcpdump from tcpdump.org. tcpdump is run on the DHCP server, where the DHCP server is dhcpd from OpenBSD 3.8. In these examples, long lines from tcpdump are wrapped for readability. Fields from the IP header, UDP header, and BOOTP header are shown in the first paragraph. Following "Vendor-rfc1048" are the DHCP options. CID is the MAC address of the client, FIN is the host name, and PR is the parameter request list.

Following each example is a description of features that may be used to uniquely identify (or fingerprint) the particular operating system.

The following is an example of a tcpdump from a DHCP discover message from a client running Windows XP Pro:

```
    07:11:13.947557 IP (tos 0x0, ttl 128, id 235, offset 0, flags [none],
proto: UDP (17), length: 328) 0.0.0.0.68 > 255.255.255.255.67:
[udp sum ok] BOOTP/DHCP, Request from 00:0d:60:b2:61:6b,
length: 300, xid:0x8f05fbad, flags: [none] (0x0000)
        Client Ethernet Address: 00:0d:60:b2:61:6b
        Vendor-rfc1048:
        DHCP:DISCOVER
        NOAUTO:Y
        CID:[ether]00:0d:60:b2:61:6b
        HN:"kstevens-xp"
        VC:"MSFT 5.0"
        PR:SM+DN+DG+NS+WNS+WNT+WSC+RD+SR+T249+VO
```

The following is an example of a tcpdump from a DHCP request message from a client running Windows XP Pro:

```
    07:11:13.951036 IP (tos 0x0, ttl 128, id 236, offset 0, flags [none],
proto: UDP (17), length: 346) 0.0.0.0.68 > 255.255.255.255.67:
[udp sum ok] BOOTP/DHCP, Request from 00:0d:60:b2:61:6b,
length: 318, xid:0x8f05fbad, flags: [none] (0x0000)
        Client Ethernet Address: 00:0d:60:b2:61:6b
        Vendor-rfc1048:
        DHCP:REQUEST
        CID:[ether]00:0d:60:b2:61:6b
        RQ:172.29.10.104
        SID:172.29.10.254
        HN:"kstevens-xp"
        FQDN:"kstevens-xp."
        VC:"MSFT 5.0"
        PR:SM+DN+DG+NS+WNS+WNT+WSC+RD+SR+T249+VO
```

As shown, the client sets the auto configuration option (option 116 defined in RFC 2563) to 1 ("NOAUTO:Y"). The vendor class identifier is set to "MSFT 5.0". Windows 2000 and XP DHCP clients may set vendor class to this string; Windows 98 and Microsoft Windows ME DHCP clients may set the value to "MSFT 98".

The parameter request list includes several NETBIOS options ("WNS+WNT+WSC"), which are specific to Windows. It also includes the router discovery request option (option 31) as well as option 249, which is in the private use range.

The following is an example of a tcpdump from a DHCP discover message from a client running Mac OS X:

```
07:04:51.387677 IP (tos 0x0, ttl 255, id 37449, offset 0, flags [none],
proto: UDP (17), length: 328) 0.0.0.68 > 255.255.255.67:
[udp sum ok] BOOTP/DHCP, Request from 00:11:24:8a:a6:82,
length: 300, xid:0x51198f82, flags: [none] (0x0000)
        Client Ethernet Address: 00:11:24:8a:a6:82
        Vendor-rfc1048:
         DHCP:DISCOVER
         PR:SM+DG+NS+DN+NI+NITAG+SLP-DA+SLP-
SCOPE+LDAP+T252
         MSZ:1500
         CID:[ether]00:11:24:8a:a6:82
         LT:7776000
         HN:"lava"
```

The following is an example of a tcpdump from a DHCP request message from a client running Mac OS X:

```
07:04:53.407565 IP (tos 0x0, ttl 255, id 37450, offset 0, flags [none],
proto: UDP (17), length: 328) 0.0.0.68 > 255.255.255.67:
[udp sum ok] BOOTP/DHCP, Request from 00:11:24:8a:a6:82,
length: 300, xid:0x51198f82, secs:2, flags: [none] (0x0000)
        Client Ethernet Address: 00:11:24:8a:a6:82
        Vendor-rfc1048:
         DHCP:REQUEST
         PR:SM+DG+NS+DN+NI+NITAG+SLP-DA+SLP-
SCOPE+LDAP+T252
         MSZ:1500
         CID:[ether]00:11:24:8a:a6:82
         RQ:172.29.10.103
         SID:172.29.10.254
         HN:"lava"
```

The parameter request list contains SLP (Service Location Protocol, RFC 2610) and Netinfo options (112 and 113 which are referenced in RFC 3679 and appear to be Apple specific). The maximum message size option (option 57) is set to 1500.

The following is an example of a tcpdump from a DHCP discover message from a client running Apple Airport Express:

```
06:51:44.999176 IP (tos 0x0, ttl 32, id 31927, offset 0, flags [DF],
proto: UDP (17), length: 304) 0.0.0.68 > 255.255.255.67:
[udp sum ok] BOOTP/DHCP, Request from 00:11:24:04:30:0c,
length: 276, xid:0xdeac69d7, flags: [none] (0x0000)
        Client Ethernet Address: 00:11:24:04:30:0c
        Vendor-rfc1048:
         DHCP:DISCOVER
         MSZ:590
         PR:SM+DG+NS+DN
         HN:"lava2"
         LT:7776000
         CID:[ether]00:11:24:04:30:0c
```

The following is an example of a tcpdump from a DHCP request message from a client running Apple Airport Express:

```
06:51:49.999209 IP (tos 0x0, ttl 32, id 34999, offset 0, flags [DF],
proto: UDP (17), length: 316) 0.0.0.68 > 255.255.255.67:
[udp sum ok] BOOTP/DHCP, Request from 00:11:24:04:30:0c,
length: 288, xid:0xdeac69d7, flags: [none] (0x0000)
        Client Ethernet Address: 00:11:24:04:30:0c
        Vendor-rfc1048:
         DHCP:REQUEST
         RQ:172.29.10.101
         SID:172.29.10.254
         MSZ:590
         PR:SM+DG+NS+DN
         HN:"lava2"
         LT:7776000
         CID:[ether]00:11:24:04:30:0c
```

In this case, the parameter request list is shorter than that in the other examples. The parameter request list sets the maximum message size to 590 (the default maximum is 576 bytes). The IP TTL is 32 and the DF bit is set.

The following is an example of a tcpdump from a DHCP discover message from a client running NetScreen ScreenOS:

```
07:02:59.007903 IP (tos 0x0, ttl 64, id 1236, offset 0, flags [none],
proto: UDP (17), length: 328) 0.0.0.68 > 255.255.255.67:
[udp sum ok] BOOTP/DHCP, Request from 00:10:db:1b:8e:91,
length: 300, xid:0x22a6, flags: [none] (0x0000)
        Client Ethernet Address: 00:10:db:1b:8e:91
        Vendor-rfc1048:
         DHCP:DISCOVER
         HN:"ns5xp"
         CID:[ether]00:10:db:1b:8e:91
         VC:"netscreen-5"
         PR:LT+SID+SM+DG+NS+DN+WNS
```

The following is an example of a tcpdump from a DHCP request message from a client running NetScreen ScreenOS:

```
07:03:00.018880 IP (tos 0x0, ttl 64, id 1237, offset 0, flags [none],
proto: UDP (17), length: 328) 0.0.0.68 > 255.255.255.67:
[udp sum ok] BOOTP/DHCP, Request from 00:10:db:1b:8e:91,
length: 300, xid:0x22a6, flags: [none] (0x0000)
        Client Ethernet Address: 00:10:db:1b:8e:91
        Vendor-rfc1048:
         DHCP:REQUEST
         RQ:172.29.10.102
         HN:"ns5xp"
         CID:[ether]00:10:db:1b:8e:91
         VC:"netscreen-5"
         SID:172.29.10.254
         PR:LT+SID+SM+DG+NS+DN
```

The vendor class identifier is set to "netscreen-5". This DHCP client sets the IP address lease time option (option 51) in the parameter request list which may be a bug in this version; this option should be used to request a specific lease time. The server identifier option (option 54) is in the request list, which may also be a bug. The transaction identifier is using less than 16 bits of the 32 bits available.

The following is an example of a tcpdump from a DHCP discover message from a client running OpenBSD:

```
06:48:15.369166 IP (tos 0x10, ttl 16, id 0, offset 0, flags [none],
proto: UDP (17), length:328) 0.0.0.68 > 255.255.255.67:
[udp sum ok] BOOTP/DHCP, Request from 00:03:47:74:44:04,
length: 300, xid:0xebcad12f, flags: [none] (0x0000)
        Client Ethernet Address: 00:03:47:74:44:04
        Vendor-rfc1048:
         HN:"anchor"
         DHCP: DISCOVER
         PR:SM+BR+DG+DN+NS+HN
```

The following is an example of a tcpdump from a DHCP request message from a client running OpenBSD:

```
        06:48:17.419071 IP (tos 0x10, ttl 16, id 0, offset 0, flags [none],
proto: UDP (17), length: 328) 0.0.0.0.68 > 255.255.255.255.67:
[udp sum ok] BOOTP/DHCP, Request from 00:03:47:74:44:04,
length: 300, xid:0xebcad12f, flags: [none] (0x0000)
            Client Ethernet Address: 00:03:47:74:44:04
            Vendor-rfc1048:
              HN:"anchor"
              RQ:172.29.10.100
              DHCP:REQUEST
              SID:172.29.10.254
              PR: SM+BR+DG+DN+NS+HN
```

The OpenBSD 3.8 DHCP client is based on the ISC DHCP client, dhclient. By default, the ISC DHCP client requests the subnet-mask, broadcast-address, time-offset, routers, domain-name, domain-name-servers and host-name options. In this case, the host dhclient.conf has overridden the default to: request subnet-mask, broadcast-address, routers, domain-name, domain-name-servers, host-name.

TOS is 0x10 (minimize delay). Other clients in the above examples do not set TOS. IP TTL is 16. Other clients in the above examples do not have an IP TTL of 16. IP ID is 0 and other clients in the above examples have a nonzero IP ID. These values are set in packet.c:assemble_udp_ip_header( ). In this case, these features may characterize the implementation, but not the OS. For example, an indication that the message is from an ISC DHCP client (with an unknown OS) is returned.

Figure 4:
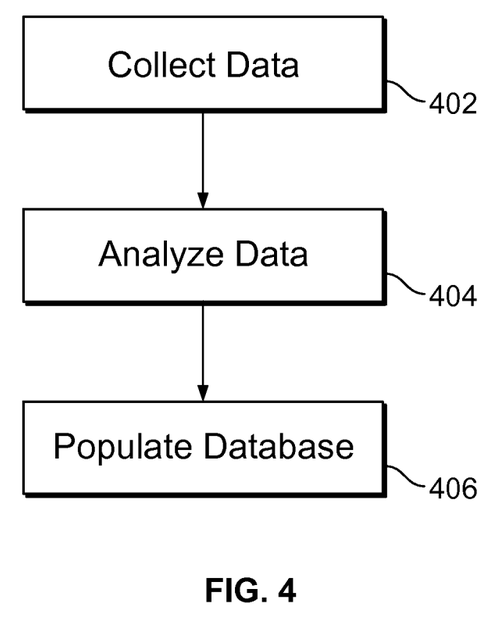
FIG. 4 is a flowchart illustrating an embodiment of a process for creating a fingerprint database.

FIG. 4 is a flowchart illustrating an embodiment of a process for creating a fingerprint database. In some embodiments, this process is used to implement fingerprint database 102. At 402, data is collected. In some embodiments, messages from a known operating system associated with DHCP are observed and collected. Data is extracted from the messages. Examples of data include features of the messages, such as fields, field values, and order of fields and field values. For example, the data collected includes the DHCP options and the order of the DHCP options. In some embodiments, rather than observing DHCP messages from a known operating system, the source code is available and data is obtained from source code. In some embodiments, data is collected for multiple operating systems and all the data is stored in a table for analysis. In some embodiments, data is collected for all operating systems from which an operating system determination block expects to receive DHCP messages. At 404, the data is analyzed. Analysis may be manual or automatic. In some embodiments, the table is analyzed for one or more field values and/or order of field values that are unique to one or more operating systems. For each operating system, a set of one or more field values and/or order of field values is identified. At 406, the fingerprint database is populated. In various embodiments, the fingerprint database may be stored in various ways. The data may be accessed using an ordered tree, as more fully described below.

In some embodiments, for each operating system, the following fingerprint data is stored:

```
FP: name of operating system
IP data:
    IH_TOS: IP type of service. Hex. Exact match.
    IH_ID: IP identification. Decimal. Exact match.
    IH_FLAGS: DF0 or DF1. Match if DF bit set (DF1) or not
      set (DF0)
UDP data:
```

-continued

```
    UH_SUM: UDP checksum. Exact match. Match no
      checksum (0).
BOOTP data:
    BH_FLAGS: Flags. BC can be used to match broadcast bit.
DHCP data:
    DO_ST:standard-name:value Document standard names; ISC
standard options as base.
    DO_code:type:value Document type and value formats; ISC
option definitions as base.
```

The following is an example of data stored in a fingerprint database for an Avaya IP telephone:

```
FP:Avaya IP Telephone
IH_TOS:0x0
IH_FLAGS:DF1
# match DHCPDISCOVER only
DO_ST:dhcp-message-type:1
DO_ST:dhcp-parameter-request-list-match-all:7,43,60,176
DO_ST:vendor-class-identifier:"ccp.avaya.com"
DO_ST:dhcp-option-overload:2
DO_ST:dhcp-max-message-size:590
```

The following is an example of data stored in a fingerprint database for a Cisco IP telephone:

```
FP:Cisco IP Telephone
IH_TOS:0x0
IH_FLAGS:DF0
UH_SUM:0
BH_FLAGS:BC
# regexp match for vendor class
DO_60:text-re:"˜Cisco Systems, Inc\. IP Phone"
# all options must appear in parameter request list
DO_ST:dhcp-parameter-request-list-match-all:35,150
```

The following is an example of data stored in a fingerprint database for Windows XP Pro for a DHCP discover message:

```
FP:Windows XP Pro
# DHCPDISCOVER
DO_ST:dhcp-message-type:1
DO_116:unsigned integer 8:1
DO_ST:vendor-class-identifier:"MSFT 5.0"
DO_ST:dhcp-parameter-request-list-match-all:43,31,249
```

The following is an example of data stored in a fingerprint database for Windows XP Pro for a DHCP request message:

```
FP:Windows XP Pro
# DHCPREQUEST has no option 116
DO_ST:dhcp-message-type:3
DO_ST:vendor-class-identifier:"MSFT 5.0"
DO_ST:dhcp-parameter-request-list-match-all:43,31,249
```

Figure 5A:
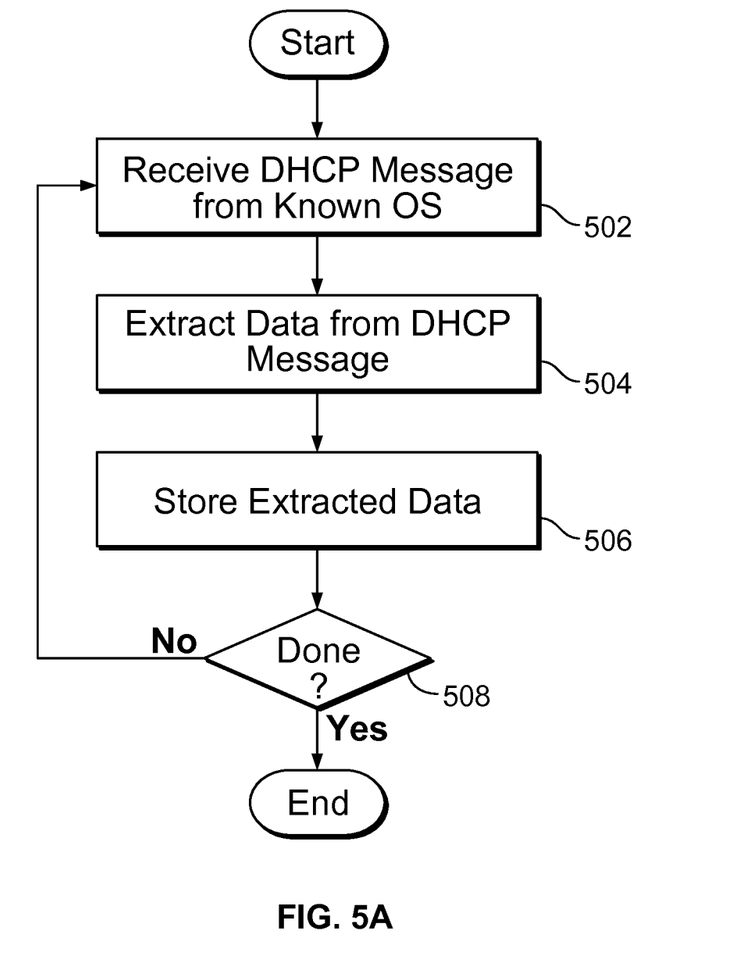
FIG. 5A is a flow chart illustrating an embodiment of a process for collecting data for the purposes of creating a fingerprint database.

FIG. 5A is a flow chart illustrating an embodiment of a process for collecting data for the purposes of creating a fingerprint database. In some embodiments, this process is used to perform 402. At 502, a DHCP message is received from a device running a known operating system to be fingerprinted. For example, the DHCP message is a DHCP discover or request message. At 504, data is extracted from the DHCP message. In some embodiments, the fields, field values, and/or order of the field values are extracted. For example, IP header field values, UDP header field values, BOOTP header field values, and DHCP options field values are collected. The DHCP options fields and the order of the DHCP options fields are collected. The DHCP options fields include the parameter request list. The parameters requested and the order of the parameters requested is collected.

At 506, the extracted data is stored. For example, the extracted data is stored in a table, a file, and/or a database. At 508, it is determined if the process is done. In some embodiments, the process is done when a sufficient number of messages have been received to fingerprint the operating system. For example, if it is observed that a particular field has a value in a message, but the value changes in another message from the same operating system, then that value cannot necessarily be used to fingerprint the operating system. Therefore, it may be useful to observe more than one message from an operating system to determine a fingerprint. If the process is not done, the process returns to 502.

In some embodiments, process 500 is performed to collect data for each operating system to be fingerprinted.

Figure 5B:
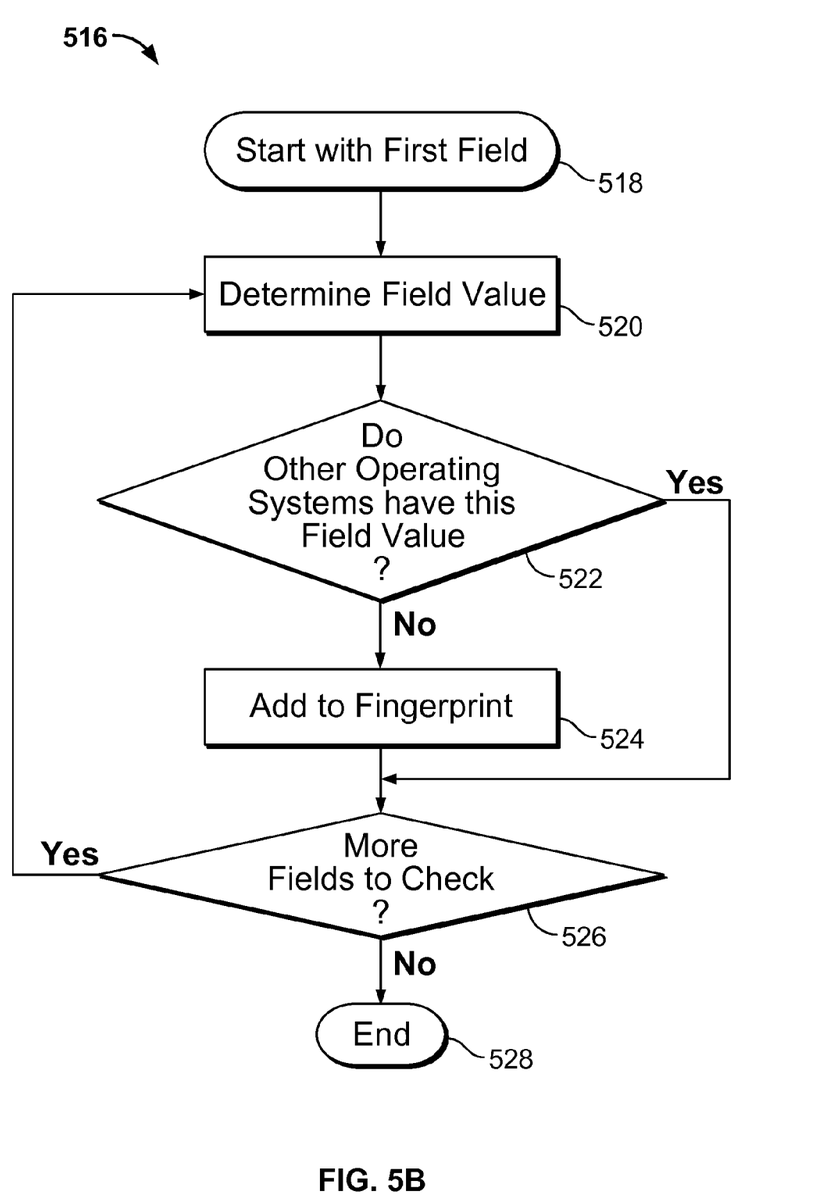
FIG. 5B is a flow chart illustrating an embodiment of a process for analyzing data to determine a fingerprint of an operating system.

FIG. 5B is a flow chart illustrating an embodiment of a process for analyzing data to determine a fingerprint of an operating system. In some embodiments, process 516 is used to perform 404 for each operating system to be fingerprinted. Process 516 may be performed automatically (e.g., by a program) or manually (e.g., by a user).

At 518, the process starts by picking a first field. At 520, the value of the field is determined. At 522, it is determined whether any other operating systems have the same field value. If not, then the field and field value are added to the fingerprint for that OS at 524 and the process continues at 526. If it is determined that one or more operating systems have the same field value, then the process continues at 526. At 526, it is determined whether there are other fields to check. If there are other fields to check, the process returns to 520. If there are no other fields to check, the process ends at 528.

In this example, a fingerprint based on field values is determined. In some embodiments, a fingerprint based on a combination of one or more field values is determined. For example, rather than determining a single field value, at 520, a combination of two or more field values is determined. At 526, it is determined whether there are other combinations to check. In some embodiments, all combinations are checked. Similarly, this process may be altered as appropriate for determining a fingerprint based on fields, order of fields, order of field values, and any other appropriate feature.

Figure 6:
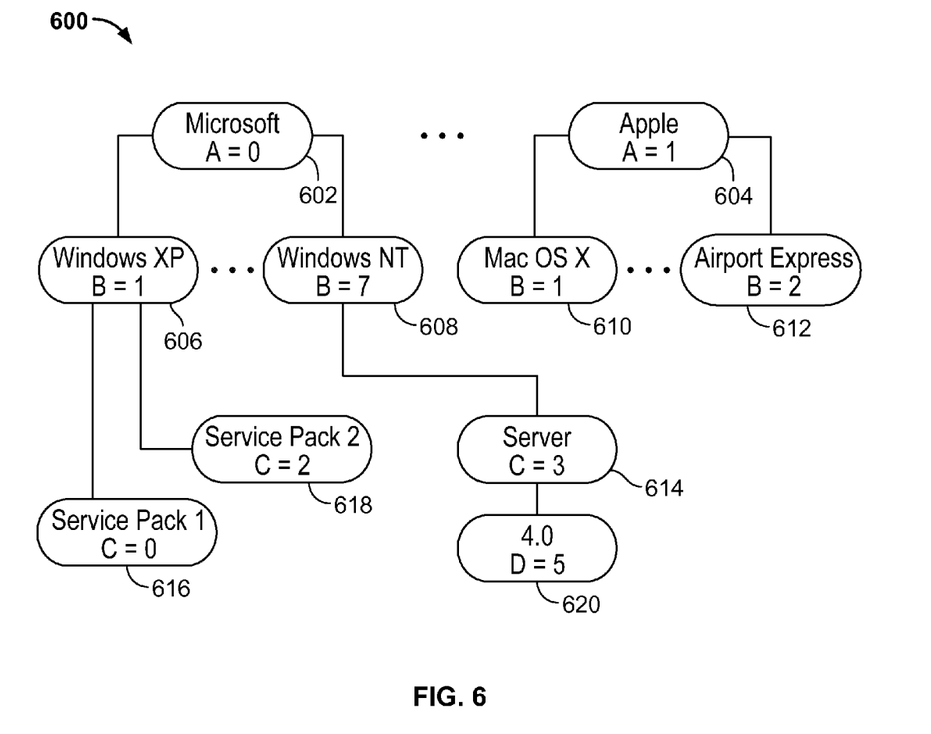
FIG. 6 is a flow chart illustrating an embodiment of an ordered tree used in conjunction with a fingerprint database.

FIG. 6 is a flow chart illustrating an embodiment of an ordered tree used in conjunction with a fingerprint database. In the example shown, ordered tree 600 is arranged based at least in part on an operating system hierarchy. Ordered tree 600 is shown to include root nodes 602-604, branch nodes 606-614, and leaf nodes 616-620. Root nodes 602-604 correspond to vendors of operating systems. In this case, node 602 corresponds to Microsoft and node 604 corresponds to Apple. Branch nodes 606-614 correspond to operating system products associated with each vendor. For example, node 606 corresponds to Windows XP and is a child of node 602. Similarly, node 610 corresponds to Mac OS X and is a child of node 604. The next level down includes nodes 616, 618, and 614. These nodes correspond to more specific versions of their parent nodes. For example, node 618 corresponds to Service Pack 2, which is a child of node 606. Thus, node 618 corresponds to Microsoft Windows XP Service Pack 2. In this example, node 614 corresponds to Windows NT Server and is a child of node 608 (Windows NT). Down one more level is leaf node 620, which corresponds to Windows NT Server 4.0 and is a child of node 614. Ordered tree 600 is an example and does not necessarily correspond to actual operating system versions, updates, and patches.

In some embodiments, each node is associated with (e.g., points to, references, etc.) data in an operating system fingerprint database. The parent nodes are associated with high level fingerprints that are unique to the parent. The branch nodes are associated with lower level fingerprints that are unique to the branch node. The leaf nodes are associated with specific fingerprints unique to the leaf node.

For example, assume that three fields are used to fingerprint operating systems: A, B, and C. Microsoft uniquely sets field A to 0, Windows XP uniquely sets field B to 1, and Windows XP Service Pack 2 uniquely sets field C to 2. The high level fingerprint for Windows is A=0. The fingerprint for node 606 is A=0, B=1. The fingerprint for node 618 is A=0, B=1, C=2. Child nodes have fingerprints that include the fingerprints of their parent nodes.

In some embodiments, process 516 may be used to determine fingerprints for each node of ordered tree 600. For example, to determine a fingerprint for node 602, at 518 and 526, fields to check are fields that have field values that are common to all operating systems from that vendor. At 522, it is determined whether other vendors have the field and field value. If not, then at 524, the field and field value are added to the fingerprint for the vendor.

In some embodiments, ordered tree 600 is used in conjunction with a fingerprint database, such as fingerprint database 102, to determine operating system data associated with a client sending a DHCP message. In some embodiments, ordered tree 600 is used at 206 to determine operating system data based on extracted data.

Figure 7:
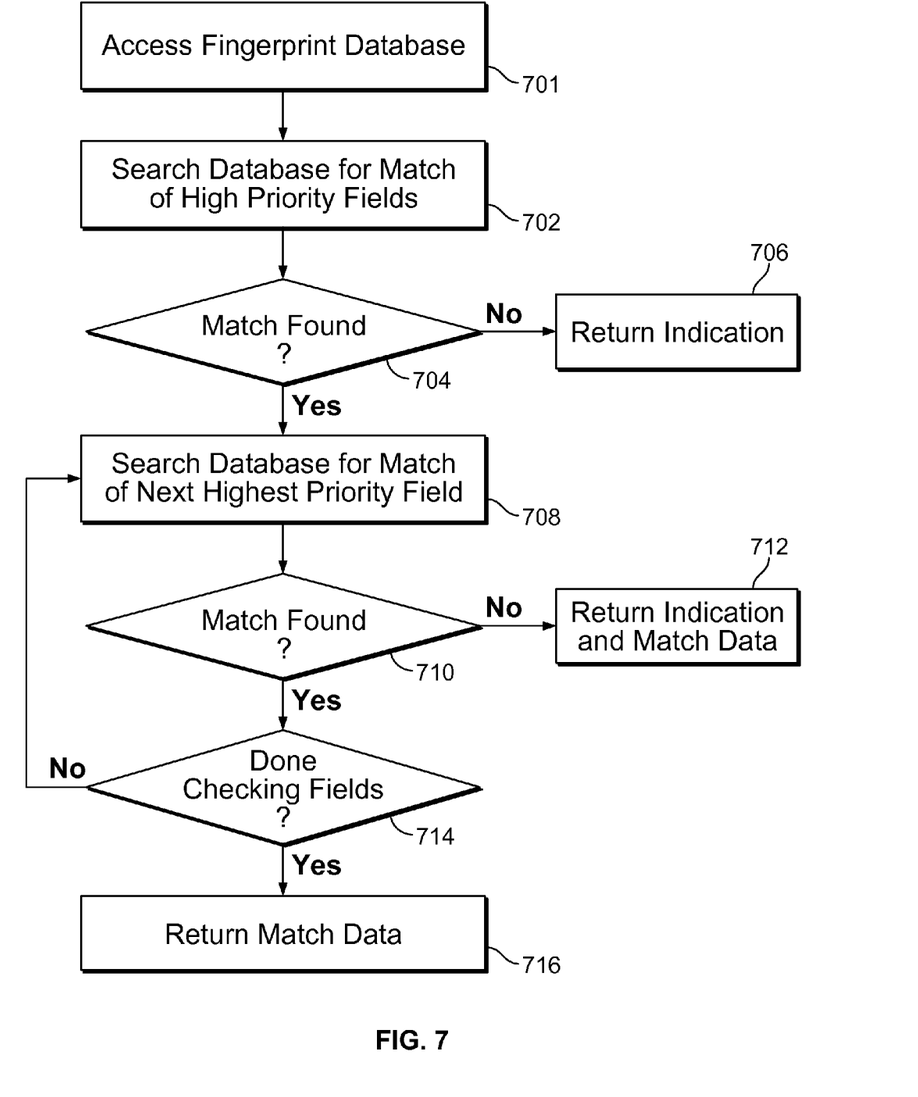
FIG. 7 is a flow chart illustrating an embodiment of a process for determining operating system data based on extracted data from a DHCP message.

FIG. 7 is a flow chart illustrating an embodiment of a process for determining operating system data based on extracted data from a DHCP message. In some embodiments, this process is performed by OS data determination block 106. In some embodiments, this process is used to perform 206.

At 701, a fingerprint database is accessed. For example, fingerprint database 102 is accessed. At 702, the database is searched for a match of a high priority field. In some embodiments, fields are prioritized hierarchically according to an ordered tree. For example, a high priority field corresponds to a field that uniquely identifies the operating system at a root node. For example, in FIG. 6, nodes 602 and 604 are root nodes and A is a high priority field. All child nodes of node 602 also have field A set to 0. In some embodiments, the DHCP option "vendor class" is a high priority field.

At 704, it is determined whether a match is found. For example, if the message has field A set to 0, then a match with node 602 is found. If a match is not found, an indication of this is returned at 706. If a match is found, the database is searched for a match of the next highest priority field at 708. The next highest priority field corresponds to a field that uniquely identifies the operating system at the next lowest node. For example, in FIG. 6, nodes 606 and 608 are the next lowest nodes after node 602. If for example field B distinguishes node 606 from node 608, it is the next highest priority field.

At 710, it is determined if a match is found. If a match is not found, an indication of this and match data is returned at 712. For example, if the message had field A set to 0 and field B set to 5, then a match for field B is not found in ordered tree 600. An indication that Microsoft was found (but no further match was found) is returned. As shown in this example, an exact match of all fields is not needed to return operating system data.

If at 710, a match is found, then it is determined whether checking fields is done at 714. For example, it is determined whether there is another field to check. In FIG. 6, for example, after field B is checked, field C can still be checked, so it is determined that it is not done checking fields. If it is not done checking fields, the process returns to 708. For example, the next highest priority field after field B is field C and the database is searched for a match to the value of field C.

If at 714, it is determined that it is done checking fields, then an indication and match data is returned at 716. For example, if the message had field A set to 0, field B set to 1, and field C set to 2, then "Microsoft Windows XP Service Pack 2" is returned. In some embodiments, an indication that all field matches were made (or the fingerprint was an exact or 100% match) is returned. In some embodiments, the fact that "Microsoft Windows XP Service Pack 2" is associated with a leaf node indicates that all field matches were made.

In some embodiments, at 704 and/or 710, if a match is not found, a search the process continues to look for matches of other fields. For example, if the message had field A set to 0, field B set to 4, and field C set to 2, then even though field B does not have a match (see FIG. 6), field C has a match with node 618. Therefore, "Microsoft Windows XP Service Pack 2" is returned in this example.

In some embodiments, the fields are not prioritized, and the match is based on the number of matching fields. For example, if the DHCP message has field A set to 3, field B set to 1, and field C set to 2, then "Microsoft Windows XP Service Pack 2" is returned even though field A is not 0 because two fields (fields B and C) match the fingerprint for Microsoft Windows XP Service Pack 2. None of the other nodes have two or more matching fields.

Various rules may be set for resolving ties. For example, if the DHCP message has field A set to 3, field B set to 1, and field C set to 9, then the closest match is either Microsoft Windows XP or Apple Mac OS X, in which field B is set to 1. In this case, the rule may be to check other features. In some embodiments, the other features were not originally extracted and are now extracted. In some embodiments, an indication of the tie and both matches are returned.

In some embodiments, multiple candidates are returned. In some embodiments, each candidate is returned with a score associated with the strength, confidence, and/or accuracy of the match. For example, a score could be based on the number of matching features (e.g., 80% score for matching 4 out of 5 features). In some embodiments, unless an exact match is made, then a match is not returned. In various embodiments, various data may be returned. For example, it may be possible to rule out operating systems. Data about which operating systems the message is not from may be returned in this case.

As previously described, besides field values, other features of the DHCP message can be used to find matches. Examples of other features include fields, order of the fields, and order of the field values. These features can be incorporated into an ordered tree used to access the fingerprint database. For example, each node in an ordered tree corresponds to one or more features. In FIG. 7, features are prioritized rather than fields. For example, the following features could be prioritized in the following order: value of field A, value of field B, order of the values of field D, order of fields A and B, and presence of field E. In some embodiments, whether the DHCP option "vendor class" includes the text "MSFT" is a high priority feature corresponding to the root node match.

In some embodiments, there is an implementation error in a DHCP client that is fixed in a subsequent version. For example, in the Netscreen ScreenOS example described above, the fact that both LT and SID are included in the parameter request list may be a bug. Their presence in a DHCP message might be used in a fingerprint of Netscreen ScreenOS. For example, if this bug was present in version x of Netscreen ScreenOS and all previous versions, and if a message is received that does not contain LT and SID, then an indication that the message is from a version later than version x is returned.

Various techniques may be used to determine a match. As shown by these examples, an exact match of the features is not required to determine operating system data. In other words, features do not need to be in the same order or all have the same value in order to determine a match. For example, if a fingerprint has fields A=0, B=1, and C=2, in that order and a message has fields B=1, A=0 in that order, a match could be determined even though the message does not have a field C, nor does it list the fields in the same order as the finger print.

Although the terms "client" or "client device" may be used in these examples, the techniques described herein may be used with any appropriate device. Besides DHCP messages, the techniques described herein may apply to other types of messages. For example, these techniques may be extended to Domain Name System (DNS) messages. For example, a DNS server could use these techniques to fingerprint resolvers and servers making queries.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining operating system data, comprising:
   receiving at a processor of a Dynamic Host Configuration Protocol (DHCP) server a DHCP message;
   extracting a set of one or more features from the DHCP message using the processor; and
   determining operating system data using the processor, wherein the determining operating system data is performed using at least in part by matching one or more features of the DHCP message with one or more features of a fingerprint associated with an operating system at a plurality of levels of granularity of a data representation of operating system hierarchy, wherein matching includes determining a partial match of the features.

2. The method as recited in claim 1, wherein matching includes determining an exact match of the features.

3. The method as recited in claim 1, wherein the features of a fingerprint comprise multiple fields.

4. The method as recited in claim 1, wherein higher level nodes in the data representation of operating system hierarchy organized by levels of granularity of operating system hierarchy are associated with high level fingerprints unique to the higher level node.

5. The method as recited in claim 1, wherein features of a fingerprint are obtained from a fingerprint database, and wherein the fingerprint database is created at least in part by:
   collecting DHCP messages from a plurality of known operating systems;
   extracting fields from the received DHCP messages;
   analyzing the extracted fields, including, for each known operating system identifying features of a fingerprint for each level of granularity of operating system data that is unique to the known operating system, wherein features of a fingerprint comprise one or more fields, order of fields, field values, or order of field values; and
   creating the fingerprint database at least in part by populating the fingerprint database with the identified features for each level of granularity of operating system data.

6. The method of claim 5, wherein analyzing the extracted fields includes, for each known operating system, identifying the order of field values that is unique to the known operating system granularity.

7. The method of claim 5, wherein creating the fingerprint database includes determining whether a sufficient number of DHCP messages have been collected prior to analyzing the extracted fields.

8. The method of claim 5, wherein creating the fingerprint database includes determining whether a sufficient number of DHCP messages have been collected prior to analyzing the extracted fields, and wherein determining whether a sufficient number of DHCP messages have been collected includes determining whether a particular field has a field value that changes from DHCP message to DHCP message for the same known operating system.

9. The method of claim 5, wherein analyzing comprises:
for each known operating system, selecting a field of the known operating system, determining the field value of the selected field, and determining whether any other of the known operating systems has the same field and field value;
in the event that it is determined that none of the other known operating systems have the same field and field value, identifying the field or field value as unique to the known operating system; and
in the event that it is determined that at least one of the other known operating systems have the same field and field value, checking another field.

10. The method of claim 5, wherein analyzing comprises:
for each known operating system, selecting a field of the known operating system, determining the order of the field values of the selected field, and determining whether any other of the known operating systems has the same field and order of the field values;
in the event that none of the other known operating systems have the same field and order of the field values, identifying the field or order of the field values as unique to the known operating system; and
in the event that at least one of the other known operating systems have the same field and order of the field values, checking another field.

11. The method as recited in claim 1, wherein the features include data from an IP header, a UDP header, a BOOTP header, or DHCP options.

12. The method as recited in claim 1, wherein the DHCP message includes a DHCP discover message, a DHCP request message, or a DHCP inform message.

13. The method as recited in claim 1, wherein the operating system data includes an implementation of a DHCP client.

14. The method as recited in claim 1, wherein the DHCP message is received from a DHCP client.

15. The method of claim 1 further comprising using the operating system data to make a policy decision.

16. The method of claim 1, wherein determining operating system data includes resolving a tie between two operating systems that have a closest match to the features of the DHCP message.

17. The method of claim 1, wherein determining operating system data includes resolving a tie between two operating systems that have a closest match to the features of the DHCP message, and wherein resolving the tie includes checking other features that were not originally extracted.

18. The method as recited in claim 1, wherein the determining operating system data performed using at least in part by matching one or more features of the DHCP message with one or more features of a fingerprint associated with the operating system at the plurality of levels of granularity of the data representation of operating system hierarchy, comprises:
traversing an ordered tree that is organized according to levels of granularity of operating system hierarchy, wherein each child node in the ordered tree corresponds to a more specific version of an operating system, wherein the ordered tree has at least two levels corresponding to at least two levels of granularity of operating system hierarchy;
obtaining features of a fingerprint associated with each node of the ordered tree organized according to levels of granularity of operating system hierarchy from a fingerprint database, wherein the fingerprint database comprises features of a fingerprint associated with each node of the ordered tree and unique to the node corresponding to a level of granularity of the operating system hierarchy, wherein a feature of a fingerprint comprises a set of one or more fields, order of fields, field values, or order of field values for each known operating system; and
checking the features of the message with the features of a fingerprint associated with a node of the ordered tree that is currently traversed, wherein a match between the features of the DHCP message and the features of the fingerprint associated with the node determines operating system data with a level of granularity represented by the node, and wherein a match of the features at every level of granularity is not required to determine operating system data.

19. The method as recited in claim 1, wherein the features include data from DHCP options fields of the DHCP message, and wherein the DHCP options fields include one or more of the following: a DHCP message type, an auto-configuration option, a client identifier, a host name, a vendor class identifier, a maximum DHCP message size, and a parameter request list.

20. A system for determining operating system data, including:
a processor of a Dynamic Host Configuration Protocol (DHCP) server configured to:
receive a DHCP message;
extract a set of one or more features from the DHCP message; and
determine operating system data, wherein the determining operating system data is performed using at least in part by matching one or more features of the DHCP message with one or more features of a fingerprint associated with an operating system at a plurality of levels of granularity of a data representation of operating system hierarchy, wherein matching includes determining a partial match of the features; and
a memory coupled with the processor, wherein the memory provides the processor with instructions.

21. The system recited in claim 20, wherein matching includes determining an exact match of the features.

22. The system recited in claim 20, wherein the features of a fingerprint comprise multiple fields.

23. The system recited in claim 20, wherein higher level nodes in the data representation of operating system hierarchy organized by levels of granularity of operating system hierarchy are associated with high level fingerprints unique to the higher level node.

24. The system recited in claim 20, wherein features of a fingerprint are obtained from a fingerprint database, and wherein the fingerprint database is created at least in part by:
collecting DHCP messages from a plurality of known operating systems;
extracting fields from the received DHCP messages;

analyzing the extracted fields, including, for each known operating system identifying features of a fingerprint for each level of granularity of operating system data that is unique to the known operating system, wherein features of a fingerprint comprise one or more fields, order of fields, field values, or order of field values; and creating the fingerprint database at least in part by populating the fingerprint database with the identified features for each level of granularity of operating system data.

25. The system recited in claim 24, wherein analyzing the extracted fields includes, for each known operating system, identifying the order of field values that is unique to the known operating system granularity.

26. The system recited in claim 24, wherein creating the fingerprint database includes determining whether a sufficient number of DHCP messages have been collected prior to analyzing the extracted fields.

27. The system recited in claim 24, wherein creating the fingerprint database includes determining whether a sufficient number of DHCP messages have been collected prior to analyzing the extracted fields, and wherein determining whether a sufficient number of DHCP messages have been collected includes determining whether a particular field has a field value that changes from DHCP message to DHCP message for the same known operating system.

28. The system recited in claim 24, wherein analyzing comprises:
    for each known operating system, selecting a field of the known operating system, determining the field value of the selected field, and determining whether any other of the known operating systems has the same field and field value;
    in the event that it is determined that none of the other known operating systems have the same field and field value, identifying the field or field value as unique to the known operating system; and
    in the event that it is determined that at least one of the other known operating systems have the same field and field value, checking another field.

29. The system recited in claim 24, wherein analyzing comprises:
    for each known operating system, selecting a field of the known operating system, determining the order of the field values of the selected field, and determining whether any other of the known operating systems has the same field and order of the field values;
    in the event that none of the other known operating systems have the same field and order of the field values, identifying the field or order of the field values as unique to the known operating system; and
    in the event that at least one of the other known operating systems have the same field and order of the field values, checking another field.

30. The system recited in claim 20, wherein the features include data from an IP header, a UDP header, a BOOTP header, or DHCP options.

31. The system recited in claim 20, wherein the DHCP message includes a DHCP discover message, a DHCP request message, or a DHCP inform message.

32. The system recited in claim 20, wherein the operating system data includes an implementation of a DHCP client.

33. The system recited in claim 20, wherein the DHCP message is received from a DHCP client.

34. The system recited in claim 20, wherein the processor of the DHCP server is further configured to use the operating system data to make a policy decision.

35. The system recited in claim 20, wherein determining operating system data includes resolving a tie between two operating systems that have a closest match to the features of the DHCP message.

36. The system recited in claim 20, wherein determining operating system data includes resolving a tie between two operating systems that have a closest match to the features of the DHCP message, and wherein resolving the tie includes checking other features that were not originally extracted.

37. The system recited in claim 20, wherein the determining operating system data performed using at least in part by matching one or more features of the DHCP message with one or more features of a fingerprint associated with the operating system at the plurality of levels of granularity of the data representation of operating system hierarchy, comprises:
    traversing an ordered tree that is organized according to levels of granularity of operating system hierarchy, wherein each child node in the ordered tree corresponds to a more specific version of an operating system, wherein the ordered tree has at least two levels corresponding to at least two levels of granularity of operating system hierarchy;
    obtaining features of a fingerprint associated with each node of the ordered tree organized according to levels of granularity of operating system hierarchy from a fingerprint database, wherein the fingerprint database comprises features of a fingerprint associated with each node of the ordered tree and unique to the node corresponding to a level of granularity of the operating system hierarchy, wherein a feature of a fingerprint comprises a set of one or more fields, order of fields, field values, or order of field values for each known operating system; and
    checking the features of the message with the features of a fingerprint associated with a node of the ordered tree that is currently traversed, wherein a match between the features of the DHCP message and the features of the fingerprint associated with the node determines operating system data with a level of granularity represented by the node, and wherein a match of the features at every level of granularity is not required to determine operating system data.

38. The system recited in claim 20, wherein the features include data from DHCP options fields of the DHCP message, and wherein the DHCP options fields include one or more of the following: a DHCP message type, an auto-configuration option, a client identifier, a host name, a vendor class identifier, a maximum DHCP message size, and a parameter request list.

39. The non-transitory computer readable storage medium and comprising computer instructions for:
    receiving a Dynamic Host Configuration Protocol (DHCP) message;
    extracting a set of one or more features from the DHCP message; and
    determining operating system data, wherein the determining operating system data is performed using at least in part by matching one or more features of the DHCP message with one or more features of a fingerprint associated with an operating system at a plurality of levels of granularity of a data representation of operating system hierarchy, wherein matching includes determining a partial match of the features.

40. The non-transitory computer readable storage medium recited in claim 39, wherein matching includes determining an exact match of the features.

41. The non-transitory computer readable storage medium recited in claim 39, wherein the features of a fingerprint comprise multiple fields.

42. The non-transitory computer readable storage medium recited in claim 39, wherein higher level nodes in the data representation of operating system hierarchy organized by levels of granularity of operating system hierarchy are associated with high level fingerprints unique to the higher level node.

43. The non-transitory computer readable storage medium recited in claim 39, wherein features of a fingerprint are obtained from a fingerprint database, and wherein the fingerprint database is created at least in part by:
 collecting DHCP messages from a plurality of known operating systems;
 extracting fields from the received DHCP messages;
 analyzing the extracted fields, including, for each known operating system identifying features of a fingerprint for each level of granularity of operating system data that is unique to the known operating system, wherein features of a fingerprint comprise one or more fields, order of fields, field values, or order of field values; and
 creating the fingerprint database at least in part by populating the fingerprint database with the identified features for each level of granularity of operating system data.

44. The non-transitory computer readable storage medium recited in claim 43, wherein analyzing the extracted fields includes, for each known operating system, identifying the order of field values that is unique to the known operating system granularity.

45. The non-transitory computer readable storage medium recited in claim 43, wherein creating the fingerprint database includes determining whether a sufficient number of DHCP messages have been collected prior to analyzing the extracted fields.

46. The non-transitory computer readable storage medium recited in claim 43, wherein creating the fingerprint database includes determining whether a sufficient number of DHCP messages have been collected prior to analyzing the extracted fields, and wherein determining whether a sufficient number of DHCP messages have been collected includes determining whether a particular field has a field value that changes from DHCP message to DHCP message for the same known operating system.

47. The non-transitory computer readable storage medium recited in claim 43, wherein analyzing comprises:
 for each known operating system, selecting a field of the known operating system, determining the field value of the selected field, and determining whether any other of the known operating systems has the same field and field value;
 in the event that it is determined that none of the other known operating systems have the same field and field value, identifying the field or field value as unique to the known operating system; and
 in the event that it is determined that at least one of the other known operating systems have the same field and field value, checking another field.

48. The non-transitory computer readable storage medium recited in claim 43, wherein analyzing comprises:
 for each known operating system, selecting a field of the known operating system, determining the order of the field values of the selected field, and determining whether any other of the known operating systems has the same field and order of the field values;
 in the event that none of the other known operating systems have the same field and order of the field values, identifying the field or order of the field values as unique to the known operating system; and
 in the event that at least one of the other known operating systems have the same field and order of the field values, checking another field.

49. The non-transitory computer readable storage medium recited in claim 39, wherein the features include data from an IP header, a UDP header, a BOOTP header, or DHCP options.

50. The non-transitory computer readable storage medium recited in claim 39, wherein the DHCP message includes a DHCP discover message, a DHCP request message, or a DHCP inform message.

51. The non-transitory computer readable storage medium recited in claim 39, wherein the operating system data includes an implementation of a DHCP client.

52. The non-transitory computer readable storage medium recited in claim 39, wherein the DHCP message is received from a DHCP client.

53. The non-transitory computer readable storage medium recited in claim 39 further comprising using the operating system data to make a policy decision.

54. The non-transitory computer readable storage medium recited in claim 39, wherein determining operating system data includes resolving a tie between two operating systems that have a closest match to the features of the DHCP message.

55. The non-transitory computer readable storage medium recited in claim 39, wherein determining operating system data includes resolving a tie between two operating systems that have a closest match to the features of the DHCP message, and wherein resolving the tie includes checking other features that were not originally extracted.

56. The non-transitory computer readable storage medium recited in claim 39, wherein the determining operating system data performed using at least in part by matching one or more features of the DHCP message with one or more features of a fingerprint associated with the operating system at the plurality of levels of granularity of the data representation of operating system hierarchy, comprises:
 traversing an ordered tree that is organized according to levels of granularity of operating system hierarchy, wherein each child node in the ordered tree corresponds to a more specific version of an operating system, wherein the ordered tree has at least two levels corresponding to at least two levels of granularity of operating system hierarchy;
 obtaining features of a fingerprint associated with each node of the ordered tree organized according to levels of granularity of operating system hierarchy from a fingerprint database, wherein the fingerprint database comprises features of a fingerprint associated with each node of the ordered tree and unique to the node corresponding to a level of granularity of the operating system hierarchy, wherein a feature of a fingerprint comprises a set of one or more fields, order of fields, field values, or order of field values for each known operating system; and
 checking the features of the message with the features of a fingerprint associated with a node of the ordered tree that is currently traversed, wherein a match between the features of the DHCP message and the features of the fingerprint associated with the node determines operating system data with a level of granularity represented by the node, and wherein a match of the features at every level of granularity is not required to determine operating system data.

57. The non-transitory computer readable storage medium recited in claim 39, wherein the features include data from DHCP options fields of the DHCP message, and wherein the DHCP options fields include one or more of the following: a DHCP message type, an auto-configuration option, a client identifier, a host name, a vendor class identifier, a maximum DHCP message size, and a parameter request list.

* * * * *